United States Patent
Park (10) Patent No.: US 11,592,302 B2
(45) Date of Patent: Feb. 28, 2023

(54) ELECTRONIC APPARATUS, MOBILE ROBOT, AND METHOD FOR OPERATING THE MOBILE ROBOT

(71) Applicant: LG ELECTRONICS INC., Seoul (KR)

(72) Inventor: Jinwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 16/836,817

(22) Filed: Mar. 31, 2020

(65) Prior Publication Data

US 2021/0187740 A1 Jun. 24, 2021

(30) Foreign Application Priority Data

Dec. 19, 2019 (KR) .................. 10-2019-0171114

(51) Int. Cl.
| | | |
|---|---|---|
| *G01C 21/34* | (2006.01) | |
| *B25J 9/16* | (2006.01) | |
| *G05D 1/02* | (2020.01) | |
| *G06K 9/62* | (2022.01) | |
| *H04W 4/029* | (2018.01) | |
| *H04W 4/024* | (2018.01) | |

(52) U.S. Cl.
CPC ........ *G01C 21/3415* (2013.01); *B25J 9/1666* (2013.01); *G01C 21/3461* (2013.01); *G05D 1/0214* (2013.01); *G06K 9/6256* (2013.01); *G06K 9/6262* (2013.01); *H04W 4/029* (2018.02); *H04W 4/024* (2018.02)

(58) Field of Classification Search
CPC ............. G01C 21/3415; G01C 21/3461; B25J 9/1666; G05D 1/0214; G06K 9/6256; G06K 9/6262; H04W 4/029; H04W 4/024
See application file for complete search history.

(56) References Cited

U.S. PATENT DOCUMENTS

| | | | | |
|---|---|---|---|---|
| 7,603,115 B2 * | 10/2009 | Banavar | ............... | H04W 76/19 |
| | | | | 455/445 |
| 7,941,108 B2 * | 5/2011 | Shaffer | .................. | G01C 21/20 |
| | | | | 455/67.14 |
| 8,311,741 B1 * | 11/2012 | Lawther | .......... | G08G 1/096811 |
| | | | | 701/527 |
| 8,559,972 B2 * | 10/2013 | Shaffer | .................. | G01C 21/20 |
| | | | | 455/445 |
| 8,712,436 B2 * | 4/2014 | Shaffer | ............... | H04W 64/006 |
| | | | | 455/456.1 |
| 9,103,677 B2 * | 8/2015 | Bauchot | ................. | G01C 21/00 |
| 9,258,724 B2 * | 2/2016 | Shaffer | ............. | G01C 21/3461 |

(Continued)

FOREIGN PATENT DOCUMENTS

| | | | | | |
|---|---|---|---|---|---|
| KR | 20120103816 A | * | 9/2012 | ......... | G01C 21/3415 |
| KR | 1020190104268 | | 9/2019 | | |
| WO | WO-2013063483 A2 | * | 5/2013 | ....... | H04L 29/06326 |

*Primary Examiner* — Dale W Hilgendorf
(74) *Attorney, Agent, or Firm* — Lee, Hong, Degerman, Kang & Waimey PC (57) ABSTRACT

A mobile robot is disclosed. The mobile robot may include a wireless transceiver, a driver, and a processor. The mobile robot may execute an artificial intelligence (AI) algorithm and/or a machine learning algorithm, and perform communications with other electronic devices in a 5G communication network. Accordingly, user convenience can be significantly improved.

9 Claims, 7 Drawing Sheets

(56) References Cited

U.S. PATENT DOCUMENTS

| | | | |
|---|---|---|---|
| 9,716,787 B1* | 7/2017 | Prakah-Asante | H04M 3/42195 |
| 2006/0259236 A1* | 11/2006 | Kaplan | G01C 21/26 340/988 |
| 2009/0005097 A1* | 1/2009 | Shaffer | G01C 21/3461 455/517 |
| 2009/0023456 A1* | 1/2009 | Seacat | G01C 21/3461 701/469 |
| 2015/0085875 A1* | 3/2015 | Phillips | H04L 65/765 370/465 |
| 2016/0316321 A1* | 10/2016 | Lin | H04W 4/029 |
| 2018/0188044 A1* | 7/2018 | Wheeler | B60W 40/02 |
| 2020/0393261 A1* | 12/2020 | Zhang | G08G 1/0133 |

\* cited by examiner

ELECTRONIC APPARATUS, MOBILE ROBOT, AND METHOD FOR OPERATING THE MOBILE ROBOT

CROSS-REFERENCE TO RELATED APPLICATION

Pursuant to 35 U.S.C. § 119(a), this application claims the benefit of earlier filing date and right of priority to Korean Patent Application No. 10-2019-0171114, filed on Dec. 19, 2019, the contents of which are hereby incorporated by reference herein in its entirety.

BACKGROUND

1. Technical Field

The present disclosure relates to an electronic device providing a service based on network performance information, a mobile robot, and an operating method thereof.

2. Description of Related Art

These days, competition in product delivery services in both online and offline markets is becoming fierce. Recently, in order to improve the convenience of customers, some retailers provide a same-day delivery service, by which customers can receive products on the same day as the order.

Also, unmanned robots that transport articles have recently been used on land or in the air, and relevant laws are being established.

A robot may refer to a machine which automatically handles a given task using its own abilities, or a machine that operates autonomously. In particular, a robot that recognizes an environment and autonomously determines to perform an operation may be referred to as an intelligent robot, and various services may be provided by the intelligent robot.

The mobile robot that is disclosed in the related art can adjust the moving speed and rotation radius thereof so as not to be toppled while moving to a destination.

However, when the mobile robot of the related art sets a route, the network circumstance is not considered.

RELATED ART DOCUMENTS

Related Art: Korean Patent Application Publication No. 10-2019-0104268 (publication date: Sep. 9, 2019)

SUMMARY OF THE INVENTION

An aspect of the present disclosure is directed to providing a mobile robot which determines a network shadow region by using a network performance estimation model, and an operating method thereof.

Another aspect of the present disclosure is directed to providing a mobile robot which collects in advance information that is necessary for the mobile robot to pass through a network shadow region, and an operating method thereof.

Yet another aspect of the present disclosure is directed to providing an electronic device which actively collects data of an application that is currently in use, by using a pre-trained network performance estimation model.

Yet another aspect of the present disclosure is directed to providing a method for collecting network performance information from a plurality of electronic devices and, on the basis of the collected information, generating a network performance estimation model.

The present disclosure is not limited to what has been described above, and other aspects not mentioned herein will be apparent from the following description to one of ordinary skill in the art to which the present disclosure pertains.

A mobile robot according to an exemplary embodiment of the present disclosure may include a driver, a wireless transceiver configured to receive location information of the mobile robot over time, and a processor configured to set a route to a destination on the basis of the location information of the mobile robot received by the wireless transceiver.

The processor may be configured to: determine a network shadow region on the route on the basis of a pre-trained network performance estimation model based on time and location; update the route so as to avoid the determined network shadow region; and control the driver such that the mobile robot moves along the updated route.

An electronic device according to an exemplary embodiment of the present disclosure may include a wireless transceiver configured to receive location information over time, and a processor configured to operate one or more applications.

The processor may be configured to: estimate a network performance level corresponding to a location of the electronic device that is received through the wireless transceiver on the basis of a pre-trained network performance estimation model based on time and location; and on the basis of the estimated network performance level, determine a point of time for receiving or transmitting data associated with the one or more applications depending on movement direction.

A method for operating a mobile robot according to an exemplary embodiment of the present disclosure may include: setting a route to a destination on the basis of location information of the mobile robot; determining a network shadow region on the route on the basis of a pre-trained network performance estimation model based on time and location; updating the route so as to avoid the determined network shadow region; and moving along the updated route.

According to various embodiments of the present disclosure, the mobile robot may avoid or pass through a network shadow region on the route. Accordingly, device safety and device efficiency may be significantly improved.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, fluids, or other matter between the so-described components.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

Since artificial intelligence techniques may be utilized in various embodiments of the present disclosure, artificial intelligence will be generally described first.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. An ANN may be defined by a connection pattern between neurons on different layers, a learning process for updating model parameters, and an activation function for generating an output value.

An ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Reference will now be made in detail to embodiments of the present disclosure, examples of which are illustrated in the accompanying drawings. In relation to describing the present disclosure, when the detailed description of the relevant known technology is determined to unnecessarily obscure the gist of the present disclosure, the detailed description may be omitted.

Terms such as "first," "second," and other numerical terms when used herein do not imply a sequence or order unless clearly indicated by the context. These terms are only used to distinguish one element from another. In addition, terms, which are specially defined in consideration of the configurations and operations of the embodiments, are given only to explain the embodiments, and do not limit the scope of the embodiments.

Figure 1:
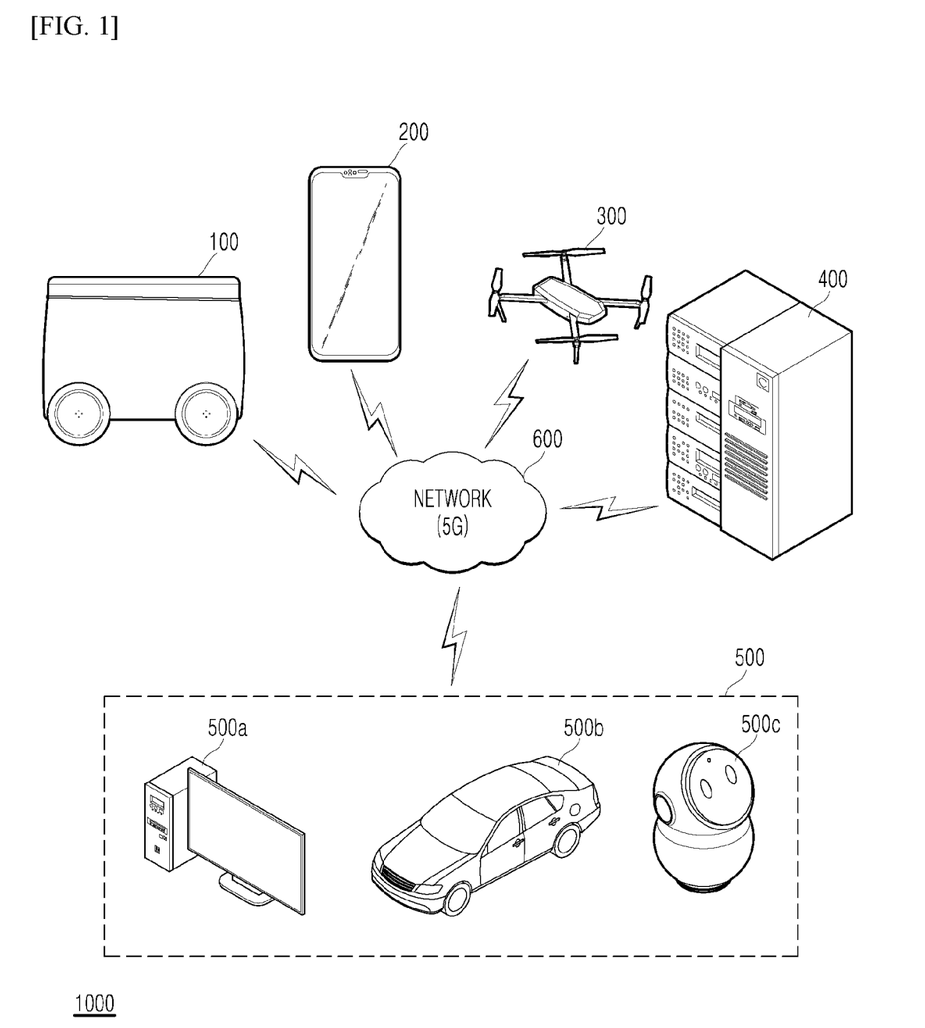
FIG. 1 is a view illustrating a 5G network-based cloud system according to one embodiment of the present disclosure.

FIG. 1 illustrates a 5G network-based cloud system 1000 according to one embodiment of the present disclosure.

Referring to FIG. 1, the cloud system 1000 may include a mobile robot 100, a mobile terminal 200, an unmanned flight vehicle 300, an information providing system 400, various devices 500, and a 5G network 600.

The mobile robot 100 may be a movable robot and may move using a plurality of wheels. The mobile robot 100 may be embodied as an automated guided vehicle (AGV), and the AGV may be a transport device that is moved by, for example, a sensor on the bottom surface thereof, a magnetic field, and a vision device. The mobile robot 100 may deliver an article to a destination from a starting point, and may deliver an article to the destination not only outdoors but also indoors.

As a selective embodiment, the mobile robot 100 may move using a plurality of legs, instead of a plurality of wheels, and may be embodied as an unmanned flight vehicle to move in the air. Furthermore, the mobile robot 100 may be embodied as a guide robot providing guide information to airport visitors at an airport.

The mobile robot 100 may transmit and receive data to and from a server and various terminals capable of performing communications through the 5G network 600. In particular, the mobile robot 100 may perform data communications with the server and terminals by using at least one of enhanced mobile broadband (eMBB), ultra-reliable and low latency communications (URLLC), or massive machine-type communications (mMTC), through the 5G network 600.

eMBB is a mobile broadband service providing, for example, multimedia content and wireless data access. In addition, more improved mobile services, such as a hotspot and a wideband coverage for accommodating the explosively increasing mobile traffic, may be provided through eMBB. Through a hotspot, high-volume traffic may be accommodated in an area where user mobility is low and user density is high. A wide and stable wireless environment and a user mobility can be secured by a wideband coverage.

The URLLC service defines more stringent requirements than existing LTE in terms of reliability and transmission delay of data transmission and reception. A 5G service for manufacturing process automation in industrial fields, telemedicine, remote surgery, transportation, and safety, may correspond to the URLLC service.

mMTC is a service which is not sensitive to transmission delay, requiring a relatively small amount of data transmission. The mMTC enables a much larger number of terminals, including, for example, sensors, than general mobile cellular phones to be simultaneously connected to a wireless access network. Here, the communication module of a terminal should be relatively cheap. In addition, an improved power efficiency and a power saving technology are required to enable the terminal to operate for several years without replacement or recharge of a battery.

The mobile terminal 200 may communicate with the mobile robot 100 through the 5G network 600. The mobile terminal 200 may include mobile devices, such as a mobile phone, a smartphone, and a wearable device, such as a smartwatch, smart glasses, and a head-mounted display (HMD).

The unmanned flight vehicle 300 may be embodied as a robot. The unmanned flight vehicle 300 may deliver an article to a destination, and may transmit a filmed video to the information providing system 400 by using the mobile communication network and the satellite communication network. Also, the unmanned flight vehicle 300 may receive information for a navigation service and control information from the information providing system 400.

The information providing system 400 may provide various services to electronic devices including the mobile robot 100, the mobile terminal 200, and the unmanned flight vehicle 300. The information providing system 400 may be embodied as a cloud, and thus may include a plurality of servers. The information providing system 400 may generate an AI-related model by performing an AI-related operation that is too difficult or takes a relatively long time for the mobile robot 100 and the mobile terminal 200 to perform, to thereby provide relevant information to the mobile robot 100 and the mobile terminal 200.

The various devices 500 may include, for example, a personal computer (PC) 500a, an autonomous vehicle 500b, and a home robot 500c. The various devices 500 may be connected to, for example, the mobile robot 100, the mobile terminal 200, the unmanned flight vehicle 300, and the information providing system 400 through the 5G network 600 in a wired or wireless manner.

The 5G network 600 may include, for example, a 5G mobile communication network, a local area network, and the Internet, and provide communication environments for the devices in a wired or wireless manner.

Figure 2:
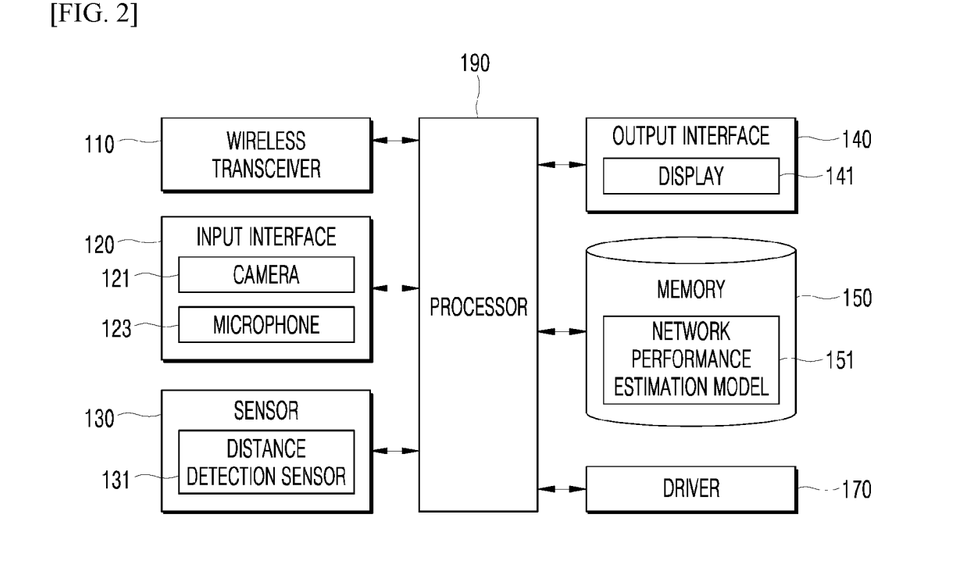
FIG. 2 is a block diagram illustrating a configuration of a mobile robot according to one embodiment of the present disclosure.

FIG. 2 is a block diagram illustrating a configuration of a mobile robot 100 according to one embodiment of the present disclosure. The mobile robot 100 may include a wireless transceiver 110, an input interface 120, a sensor 130, an output interface 140, a memory 150, a driver 170, and a processor 190. However, since the elements shown in FIG. 2 are not necessarily essential for embodying the mobile robot 100, the mobile robot 100 described in this specification may have more or fewer elements than those listed above.

The wireless transceiver 110 may include a wired and wireless communication module capable of communicating with the mobile terminal 200, the unmanned flight vehicle 300, and the information providing system 400.

The wireless transceiver 110 may include a broadcast receiver, and thus may receive broadcast signals and/or broadcast-related information from an external broadcast management server through a broadcast channel. The wireless transceiver 110 may transmit and receive a wireless signal to and from at least one of a base station, an external terminal, or a server, on a mobile communication network that is established according to reference standards for mobile communications or communication methods.

The wireless transceiver 110 may include a wireless Internet module and a near-field communication module. In addition, the wireless transceiver 110 may include a location information receiver, to receive a global positioning system (GPS) signal from a satellite outdoors and receive location information over time. The location information may include latitude information and longitude information. Further, the wireless transceiver 110 may specify the position of the mobile robot 100 by receiving WiFi signals, short-range wireless signals, beacon signals, and ultra wideband (UWB) signals indoors.

The input interface 120 may include a camera 121, a microphone 123 configured to receive audio signals, and various interface modules for receiving input of information from users. Here, the camera 121 or the microphone 123 may be regarded as a sensor, and thus a signal obtained by the camera 121 or the microphone 123 may be referred to as sensing data or sensor information.

The input interface 120 may obtain, for example, learning data for model learning and input data to be used when obtaining an output using a learning model. The input interface 120 may obtain raw input data. Here, for a pre-processing of the raw input data, the processor 190 may extract an input feature as a preprocessing of the raw input data.

The sensor 130 may obtain at least one of internal information of the mobile robot 100, information on the surroundings of the mobile robot 100, or user information, by using various sensors.

Here, the sensor 130 may include, for example, a satellite-based location sensor, a distance detection sensor 131, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (lidar) sensor, a barometer sensor, and a radar sensor. The distance detection sensor 131 may be used to detect an obstacle.

The output interface 140 may generate an output related to visual, auditory, or tactile senses. The output interface 140 may include an optical output interface and a display 141 configured to output visual information, a speaker configured to output auditory information, and a haptic module configured to output tactile information.

The memory 150 may store data that support various functions of the mobile robot 100. The memory 150 may store therein a plurality of application programs (or applications) to be driven in the mobile robot 100, data for operations of the mobile robot 100, and commands.

The memory 150 may store therein a network performance estimation model 151. The network performance estimation model 151 may be a pre-trained model, and may be trained in the mobile robot 100 and/or the information providing system 400 and be stored in the memory 150. Here, the network performance estimation model 151 may be a model which estimates a network performance in a predetermined time and region based on location information.

The driver 170 may be a module that is configured to move the mobile robot 100. Depending on the embodiments, the driver 170 may include a wheel driver, a leg driver, and a flight driver.

The processor 190 may be a module which controls configurations of the mobile robot 100, and may include one processor or a plurality of processors. The processor 190 may refer to a data processing device embedded in hardware, having a physically structured circuit to execute functions expressed as an instruction or code included in a program. As examples of the data processing device embedded in hardware, a microprocessor, a central processing unit (CPU), a processor core, a multiprocessor, an application-specific integrated circuit (ASIC), and a field programmable gate array (FPGA) may be included, but the scope of the present disclosure is not limited thereto.

The processor 190 may set a route to a destination of the mobile robot 100, on the basis of location information of the mobile robot received through the wireless transceiver 110. That is, the processor 190 may generate a route to a destination on the basis of the current location.

To this end, the processor 190 may store, in the memory 150, map information and road information of the regions on the route, and other necessary information. For example, the processor 190 may drive a navigation application stored in the memory 150, to move to a location that is inputted by the user.

The processor 190 may determine a network shadow region on the route, on the basis of the pre-trained network performance estimation model 151 based on time and location.

In detail, the processor 190 may estimate a network performance level over time at every predetermined point on the set route using the network performance estimation model 151. The processor 190 may determine a network shadow region on the route on the basis of the estimated network performance level. That is, when an estimated network performance level of a region on the route is below a predetermined level, the processor 190 may determine the region as a network shadow region. The network shadow region may be a region where an application program that is currently being used cannot be normally operated.

As a selective embodiment, the network shadow region may be determined by the information providing system 400 and then be provided to the mobile robot 100.

The processor 190 may update the route so as to avoid the determined network shadow region, and may control the driver 170 such that the mobile robot 100 moves along the updated route.

Here, the network shadow region may be a region where the network performance level is below a predetermined level, and may be a region where it is difficult to receive or transmit some information, or where data transmission is made at a lower rate than a reference rate. The network shadow region may be, for example, a region where no base station is installed, a region where user density is high, an underground passage, or a tunnel, but the embodiment is not limited thereto.

If it is difficult to avoid the determined network shadow region, the processor 190 may store, in the memory 150, information that is necessary for the mobile robot 100 to pass through the network shadow region, before the mobile robot 100 enters the network shadow region.

In another embodiment, the processor 190 may control the driver 170 such that the mobile robot 100 passes through the network shadow region without an attempt of the processor 190 to avoid the network shadow region. Here, before the mobile robot 100 passes through the network shadow region, the processor 190 may store in the memory 150 information that is required by an application program that is currently being used or that is expected to be used. In addition, the processor 190 may transmit in advance large information (such as filmed video), before the mobile robot 100 passes through the network shadow region.

Figure 3:
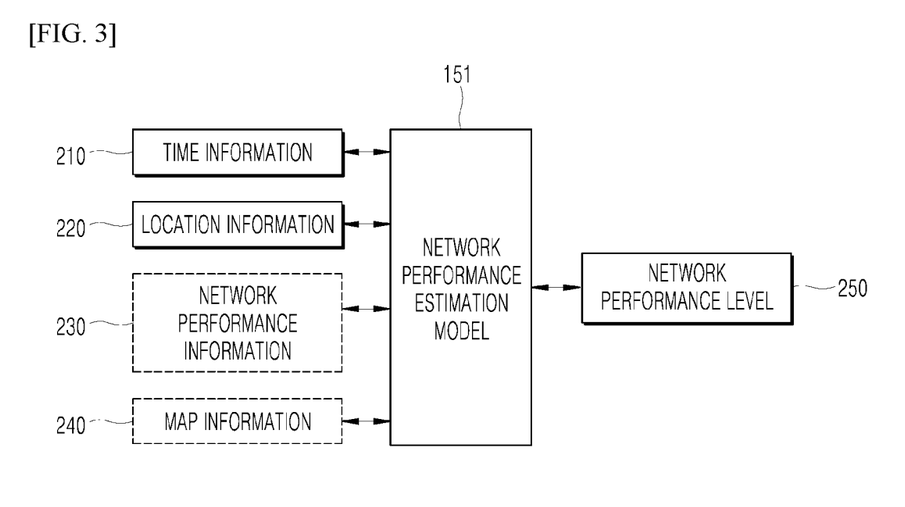
FIG. 3 is a block diagram for explaining a training step and an application step of a network performance estimation model according to one embodiment of the present disclosure.

FIG. 3 is a block diagram for explaining a training step and an application step of a network performance estimation model 151 according to one embodiment of the present disclosure.

In a training step, the network performance estimation model 151 may be generated by using information that is inputted from a plurality of electronic devices including the mobile robot 100, the mobile terminal 200, and the unmanned flight vehicle 300. In an application step, the network performance estimation model 151 may receive time information and location information from a predetermined electronic device (for example, the mobile robot 100), and then estimate a network performance level by time and location.

The network performance estimation model 151 may generally be generated in the information providing system 400, but may also be generated in the electronic devices such as the mobile robot 100 and the mobile terminal 200.

The generated network performance estimation model 151 may be stored in the memory 150 of the mobile robot 100. As a selective embodiment, the generated network performance estimation model 151 may be stored in the information providing system 400, and may provide feedback to the mobile robot 100 at the request of the mobile robot 100.

In the training step, the network performance estimation model 151 may be trained to provide a network performance level 250 as an output by receiving input of time information 210 and location information 220 of various electronic devices and network performance information 230 corresponding to location. The network performance estimation model 151 may further receive input of map information 240 of a predetermined space.

Here, the training step may be a learning step for the network performance estimation model 151 to output a desired result. The network performance estimation model 151 may be embodied as a neural network algorithm, and when the network performance estimation model 151 is embodied as a neural network algorithm, the network performance estimation model 151 may set a weighted value and a bias value defined by the neural network algorithm. In a selective embodiment, the network performance estimation model 151 may not be embodied as a neural network algorithm, but may be embodied as a statistical model through repeated training.

The time information 210 may include date information (including year, month, and day), and may include time information on when the location information was collected. Outdoors, the location information 220 may include latitude information and longitude information, and may include place name information. Indoors, the location information 220 may include inner structure information, WiFi signal information, UWB signal information, and beacon signal information.

The network performance information 230 may include at least one of uplink speed information 231 of an electronic device, downlink speed information 233 of an electronic device, or network quality indicator information 235. The network performance estimation model 151 may process or unprocess the information 231 to 235 and perform an operation by adding a weighted value to the information.

Figure 4:
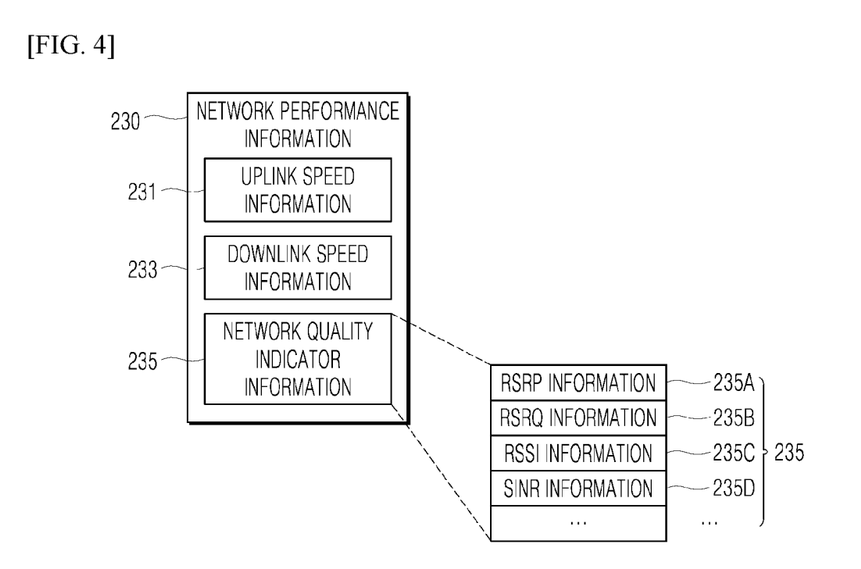
FIG. 4 is a block diagram for specifically explaining the network performance information according to one embodiment of the present disclosure.

FIG. 4 is a block diagram for specifically explaining the network performance information according to one embodiment of the present disclosure.

The network performance information 230 inputted to the network performance estimation model 151 may include uplink speed information 231 of an electronic device, downlink speed information 233 of an electronic device, and network quality indicator information 235. In the present specification, the mobile robot 100 is described as an example of the electronic device, but various electronic devices may be applied.

The uplink speed information 231 and the downlink speed information 233, included in the network performance information 230, which is important for estimating a network performance level, may be important elements for the mobile robot 100 to operate a predetermined application. For example, the mobile robot 100 may require a certain uplink speed in order to provide filmed video to the information providing system 400, and require a certain downlink speed in order to receive navigation information required for passing through a certain region.

The speed at which the uplink speed information 231 and the downlink speed information 233 are collected may vary depending on networks. For example, in the LTE communication and the 5G communication, the downlink speed information may be collected at a speed of 10 to 100 Mbps, and the uplink speed information may be collected at a speed of 3 to 50 Mbps. Meanwhile, a reference uplink speed and a reference downlink speed may vary depending on networks, and may be set at various speeds if the mobile robot 100 can perform an operation without a problem.

When the uplink speed information 231 and the downlink speed information 233 are processed, the speed information may be processed into speed level information, and speed information that is inputted may be used unprocessed.

When it is difficult to measure the uplink speed information 231 or the downlink speed information 233, the network quality indicator information 235 may be used as alternative network performance information.

The network quality indicator information 235 may include reference signal received power (RSRP) information 235A, received signal received quality (RSRQ) information (235B), received signal strength indicator (RSSI) information (235C), and signal to interference noise ratio (SINR) information 235D, and may also include a parameter for determining various wireless performances.

The RSRP information 235A, the RSRQ information 235B, and the SINR information 235D may be referred to as key performance indicator (KPI) information. The RSRP information 235A may be indicator information for measuring received power, the RSRQ information 235B may be indicator information considering the RSSI and even the number of used resource blocks, and the SINR information 235D may be indicator information indicating noise versus signal. Apart from said indicator information, various information may be used as the network quality indicator information 235.

As for the RSRP information 235A, for example, the network performance estimation model 151 may set the network performance level as level 4 if the RSRP information 235A is equal to or greater than −80 dBm, the network performance estimation model 151 may set the network performance level as level 3 if the RSRP information 235A is between −80 and −90 dBm, the network performance estimation model 151 may set the network performance level as level 2 if the RSRP information 235A is between −90 and −100 dBm, and the network performance estimation model 151 may set the network performance level as level 1 if the RSRP information 235A is equal to or greater than −100 dBm, but said numerical values may vary depending on embodiments.

In the training step, in a case where the uplink speed information 231 and the downlink speed information 233 are inputted, the uplink speed information 231 may be given a greater weighted value than the downlink speed information 233 when the network performance estimation model 151 performs an operation to estimate a network performance level. For example, the network performance estimation model 151 may set a weighted value multiplied by the uplink speed information 231 to be greater than a weighted value multiplied by the downlink speed information 233. Here, the weighted value may be different from a weighted value that is used in a neural network algorithm. Depending on embodiments, when a credibility of a downlink operation is greater than a credibility of an uplink operation in a certain application, the downlink operation may be given a greater weighted value than the uplink operation, but in the present specification, the uplink speed information 231 may be considered to be more important than the downlink speed information 233.

Here, as for the mobile robot 100, since a load required for transmitting filmed video while the mobile robot 100 is moving is greater than a load required for receiving control data and navigation data, the network performance estimation model 151 may give a greater weighted value to the uplink speed information 231 than to the downlink speed information 233. For an application where downlink speed information is relatively more important than uplink speed information, the network performance estimation model 151 may give a greater weighted value to the downlink speed information than to the uplink speed information.

In addition, in the training step, in a case where only one of the uplink speed information 231 or the downlink speed information 233 is inputted, the inputted uplink speed information 231 or downlink speed information 233 may be given a greater weighted value than inputted network quality indicator information 235 when the network performance estimation model 151 performs an operation to estimate the network performance level. This is because the uplink speed information 231 and the downlink speed information 233 are more desirable for measuring data transmission and reception performance.

The mobile robot 100 described above may determine a network shadow region by using the network performance estimation model 151 and may avoid the determined network shadow region.

When the mobile robot 100 has to pass through the network shadow region, the mobile robot 100 may receive information that is necessary to pass through the network shadow region from the information providing system 400 before the mobile robot 100 enters the network shadow region. Accordingly, a network-related problem may be prevented beforehand.

The network performance estimation model 151 may receive input of network performance information by time and location, in the training step, to thereby output a network performance level of a region on the route to the destination.

Then, if the network performance level of the region is below a predetermined level, and the mobile robot 100 determines that a certain application (for example, a navigation program) cannot operate normally in the region or that a problem may occur, the mobile robot 100 may set the region as a network shadow region. The predetermined level may be set to be the same for all applications, but may be set to be different from one another depending on the application. Further, the mobile robot 100 may determine to avoid or pass through the network shadow region.

The mobile robot 100 may be various electronic devices. The various electronic devices may include a processor operating one or more applications.

The processor of the electronic device may estimate the network performance level corresponding to the location of the electronic device received through the wireless transceiver, on the basis of the above-described network performance estimation model 151 based on time and location.

The processor of the electronic device may determine a point of time for receiving or transmitting data related to an application, depending on the movement direction of the electronic device, on the basis of the estimated network performance level. According to this, the electronic device may actively carry out data collection, to thereby improve the stability and efficiency of the device and user convenience.

A network performance estimation model applied to the electronic device may be the same as a network performance estimation model applied to the mobile robot 100.

Accordingly, in the training step, in a case where uplink speed information and downlink speed information are inputted, the inputted uplink speed information may be given a greater weighted value than the inputted downlink speed information when the network performance estimation model performs an operation to estimate a network performance level. In the case of an application with a far greater amount of downlink data than uplink data, the network performance estimation model may give a greater weighted value to the downlink speed information than to the uplink speed information to perform an operation to estimate a network performance level, depending on embodiments.

In addition, in the training step, in a case where only one of the uplink speed information or the downlink speed information is inputted, the inputted uplink speed information or downlink speed information may be given a greater weighted value than inputted network quality indicator information when the network performance estimation model performs an operation to estimate a network performance level.

Figure 5:
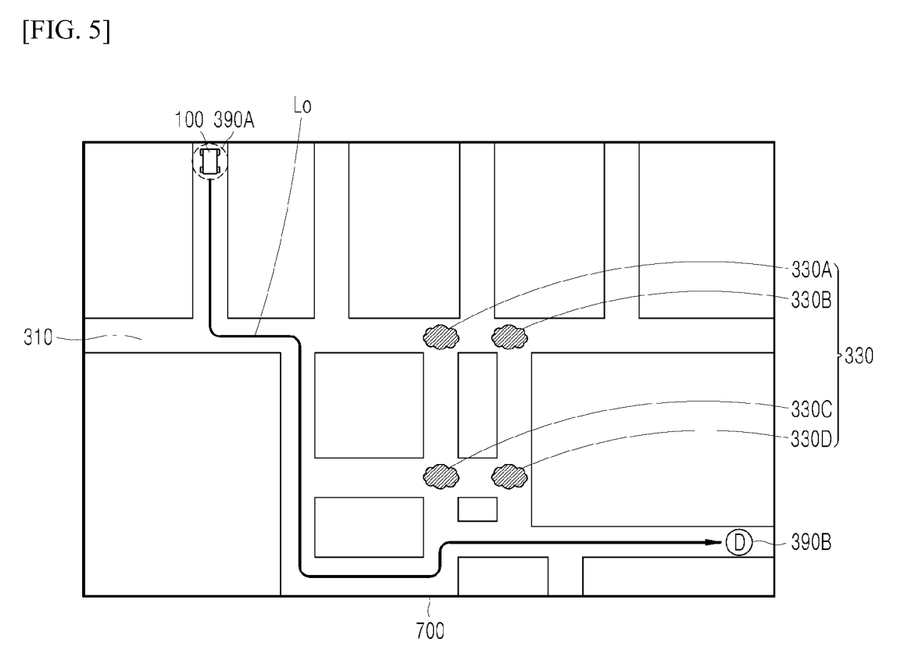
FIG. 5 is a view for explaining a mobile robot avoiding a network shadow region according to one embodiment of the present disclosure.

FIG. 5 is a view for explaining a mobile robot avoiding a network shadow region according to one embodiment of the present disclosure.

A predetermined space 700 may include a path 310 along which the mobile robot 100 can move. The mobile robot 100 may store map information of the predetermined space 700 in the memory 150, and determine network shadow regions (330: 330A to 330D) in the predetermined space 700.

The mobile robot 100 may set a route Lo from a current location 390A to a destination 390B on the basis of the pre-trained network performance estimation model 151. The mobile robot 100 may set the route Lo so as to avoid the network shadow regions (330: 330A to 330D).

If there could be a problem in operating an application while the mobile robot 100 is passing through a certain region, the certain region may be determined as a network shadow region (330: 330A to 330D). The mobile robot 100 may determine the network shadow regions (330: 330A to 330D) in which there is a problem in operating an application on the basis of the network performance level by time and location estimated by the pre-trained network performance estimation model 151.

Figure 6:
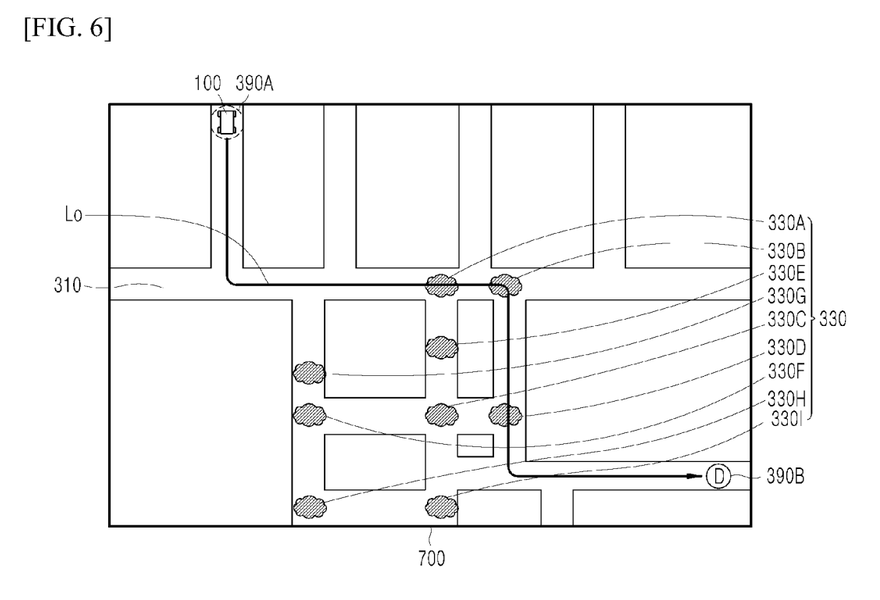
FIG. 6 is a view for explaining a mobile robot passing through a network shadow region according to one embodiment of the present disclosure.

FIG. 6 is a view for explaining a mobile robot passing through a network shadow region according to one embodiment of the present disclosure.

The mobile robot 100 may determine network shadow regions (330: 330A to 330I).

When information on the destination 390B is inputted, the mobile robot 100 may judge whether the network shadow regions (330: 330A to 330I) are located on the route Lo to the destination.

If the mobile robot 100 has to pass through the network shadow regions (330: 330A to 330I) (for example, if the shortest route includes the network shadow regions, or if there is no way to avoid the network shadow regions), the mobile robot 100 may set the route to pass through the network shadow regions (330: 330A to 330I).

Figure 7:
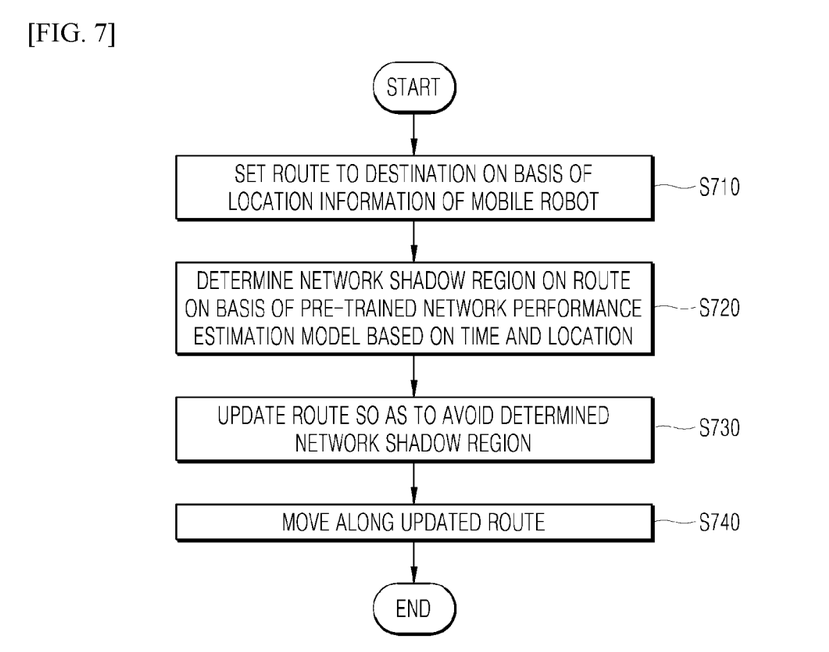
FIG. 7 is a sequence diagram for explaining a method for operating a mobile robot according to one embodiment of the present disclosure.

FIG. 7 is a sequence diagram for explaining a method for operating a mobile robot according to one embodiment of the present disclosure.

First, the mobile robot 100 may set a route to a destination on the basis of location information of the mobile robot 100 (S710).

Next, the mobile robot 100 may determine a network shadow region on the route on the basis of a pre-trained network performance estimation model based on time and location (S720).

If a network performance level of a region, which is estimated by the network performance estimation model based on time and location, is below a certain level, the mobile robot 100 may determine the region as a network shadow region.

Depending on embodiments, the mobile robot 100 may determine first a network shadow region for a certain region, and then when destination information is inputted, the mobile robot 100 may set the route so as to avoid the network shadow region.

After S720, the mobile robot 100 may update the route so as to avoid the determined network shadow region (S730).

The mobile robot 100 may move along the updated route (S740).

In S720 (network shadow region determination step), the mobile robot 100 may estimate a network performance level by time and location at every predetermined point on the set route using the network performance estimation model.

If it is difficult to avoid the determined network shadow region, the mobile robot 100 may obtain information that is necessary to pass through the network shadow region, before the mobile robot 100 enters the network shadow region.

In a selective embodiment, the mobile robot 100 may perform an operation for passing through the network shadow region, without avoiding the network shadow region.

Here, the network performance estimation model may be a learning model which is pre-trained, in a training step, to estimate a network performance level by time and location using time information, location information of one or more electronic devices, and network performance information based on locations of the electronic devices as an input.

In the training step, the inputted network performance information may include at least one of uplink speed information, downlink speed information, or network quality index information.

In the training step, in a case where the uplink speed information and the downlink speed information are inputted, the uplink speed information may be given a greater weighted value than the downlink speed information when the network performance estimation model performs an operation to estimate a network performance level.

That is, since the information of the uplink speed at which filmed video is transmitted is relatively more important, the uplink speed information may be given a greater weighted value.

In addition, in the training step, in a case where only one of the uplink speed information or the downlink speed information is inputted, the inputted uplink speed information or downlink speed information may be given a greater weighted value than inputted network quality indicator information when the network performance estimation model performs an operation to estimate a network performance level. That is, a greater weighted value may be given to real transmission and reception of data.

Meanwhile, when filmed video is transmitted to the information providing system 400 or some information is received from the information providing system 400 while a communication network (such as LTE, 5G, etc.) is used, an unexpected problem may occur if the mobile robot 100 moves without information of the network shadow region, and in the case of an unmanned flight vehicle, a serious problem may occur. The mobile robot 100 according to an embodiment of the present disclosure may prevent such a problem from occurring beforehand.

The present disclosure described above may be embodied as computer-readable codes on a medium on which a program is recorded. The computer-readable medium may include all kinds of recording devices in which computer-readable data is stored. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the processor 190 of the mobile robot 100.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A mobile robot comprising:
   a driver;
   a wireless transceiver configured to receive location information of the mobile robot over time; and
   a processor configured to set a route to a destination based on the location information of the mobile robot received by the wireless transceiver,
   wherein the processor is further configured to:
   determine a network shadow region on the route based on a pre-trained network performance estimation model based on time and location;
   update the route so as to avoid the determined network shadow region;
   control the driver such that the mobile robot moves along the updated route;
   estimate a network performance level over time at every predetermined point on the set route using the network performance estimation model; and
   based on the estimated network performance level, determine the network shadow region on the route, wherein the network performance estimation model is a learning model which is pre-trained, in a training step, to estimate the network performance level by time and location, using time information, location information of one or more electronic devices, and network performance information based on locations of the one or more electronic devices as an input, wherein in the training step, the inputted network performance information comprises at least one of uplink speed information, downlink speed information, or network quality indicator information, and wherein in the training step, based on the uplink speed information and the downlink speed information being inputted, the uplink speed information is given a greater weighted value than the downlink speed information when the network performance estimation model performs an operation for estimating the network performance level.

2. The mobile robot according to claim 1, wherein in the training step, based on only one of the uplink speed information or the downlink speed information being inputted, the inputted uplink speed information or downlink speed information is given a greater weighted value than inputted network quality indicator information when the network performance estimation model performs the operation for estimating the network performance level.

3. An electronic device comprising:
a wireless transceiver configured to receive location information over time; and
a processor configured to operate one or more applications,
wherein the processor is further configured to:
estimate a network performance level corresponding to a location of the electronic device that is received through the wireless transceiver, based on a pre-trained network performance estimation model based on time and location; and
based on the estimated network performance level, determine a point of time for receiving or transmitting data associated with the one or more applications depending on movement direction,
wherein the network performance estimation model is a learning model which is pre-trained, in a training step, to estimate the network performance level by time and location, using time information, location information of one or more electronic devices, and network performance information based on locations of the one or more electronic devices as an input,
wherein in the training step, the inputted network performance information comprises at least one of uplink speed information, downlink speed information, or network quality indicator information, and
wherein in the training step, based on the uplink speed information and the downlink speed information being inputted, the uplink speed information is given a greater weighted value than the downlink speed information when the network performance estimation model performs an operation for estimating the network performance level.

4. The electronic device according to claim 3, wherein in the training step, based on only one of the uplink speed information or the downlink speed information being inputted, the inputted uplink speed information or downlink speed information is given a greater weighted value than inputted network quality indicator information when the network performance estimation model performs the operation for estimating the network performance level.

5. A method for operating a mobile robot, the method comprising:
setting a route to a destination based on location information of the mobile robot;
determining a network shadow region on the route based on a pre-trained network performance estimation model based on time and location;
updating the route so as to avoid the determined network shadow region; and
moving along the updated route,
wherein determining the network shadow region comprises estimating, using the network performance estimation model, a network performance level by time and location at every predetermined point on the set route,
wherein the network performance estimation model is a learning model which is pre-trained, in a training step, to estimate the network performance level by time and location, using time information, location information of one or more electronic devices, and network performance information based on locations of the one or more electronic devices as an input,
wherein in the training step, the inputted network performance information comprises at least one of uplink speed information, downlink speed information, or network quality indicator information, and
wherein in the training step, based on the uplink speed information and the downlink speed information being inputted, the uplink speed information is given a greater weighted value than the downlink speed information when the network performance estimation model performs an operation for estimating the network performance level.

6. The method according to claim 5, wherein in the training step, based on only one of the uplink speed information or the downlink speed information being inputted, the inputted uplink speed information or downlink speed information is given a greater weighted value than inputted network quality indicator information when the network performance estimation model performs the operation for estimating the network performance level.

7. A mobile robot comprising:
a driver;
a wireless transceiver configured to receive location information of the mobile robot over time; and
a processor configured to set a route to a destination based on the location information of the mobile robot received by the wireless transceiver,
wherein the processor is further configured to:
determine a network shadow region on the route based on a pre-trained network performance estimation model based on time and location;
update the route so as to avoid the determined network shadow region;
control the driver such that the mobile robot moves along the updated route;
estimate a network performance level over time at every predetermined point on the set route using the network performance estimation model; and
based on the estimated network performance level, determine the network shadow region on the route,
wherein the network performance estimation model is a learning model which is pre-trained, in a training step, to estimate the network performance level by time and location, using time information, location information of one or more electronic devices, and network performance information based on locations of the one or more electronic devices as an input, wherein in the training step, the inputted network performance information comprises at least one of uplink speed information, downlink speed information, or network quality indicator information, and wherein in the training step, based on only one of the uplink speed information or the downlink speed information being inputted, the inputted uplink speed information or downlink speed information is given a greater weighted value than inputted network quality indicator information when the network performance estimation model performs an operation for estimating the network performance level.

8. An electronic device comprising:

a wireless transceiver configured to receive location information over time; and a processor configured to operate one or more applications, wherein the processor is further configured to:

estimate a network performance level corresponding to a location of the electronic device that is received through the wireless transceiver, based on a pre-trained network performance estimation model based on time and location; and based on the estimated network performance level, determine a point of time for receiving or transmitting data associated with the one or more applications depending on movement direction, wherein the network performance estimation model is a learning model which is pre-trained, in a training step, to estimate the network performance level by time and location, using time information, location information of one or more electronic devices, and network performance information based on locations of the one or more electronic devices as an input, wherein in the training step, the inputted network performance information comprises at least one of uplink speed information, downlink speed information, or network quality indicator information, and wherein in the training step, based on only one of the uplink speed information or the downlink speed information being inputted, the inputted uplink speed information or downlink speed information is given a greater weighted value than inputted network quality indicator information when the network performance estimation model performs an operation for estimating the network performance level.

9. A method for operating a mobile robot, the method comprising:

setting a route to a destination based on location information of the mobile robot;

determining a network shadow region on the route based on a pre-trained network performance estimation model based on time and location;

updating the route so as to avoid the determined network shadow region; and moving along the updated route, wherein determining the network shadow region comprises estimating, using the network performance estimation model, a network performance level by time and location at every predetermined point on the set route, wherein the network performance estimation model is a learning model which is pre-trained, in a training step, to estimate the network performance level by time and location, using time information, location information of one or more electronic devices, and network performance information based on locations of the one or more electronic devices as an input, wherein in the training step, the inputted network performance information comprises at least one of uplink speed information, downlink speed information, or network quality indicator information, and wherein in the training step, based on only one of the uplink speed information or the downlink speed information being inputted, the inputted uplink speed information or downlink speed information is given a greater weighted value than inputted network quality indicator information when the network performance estimation model performs an operation for estimating the network performance level.

* * * * *